United States Patent
Akiyama et al.

(10) Patent No.: US 12,529,424 B2
(45) Date of Patent: Jan. 20, 2026

(54) GASKET

(71) Applicant: NOK CORPORATION, Tokyo (JP)

(72) Inventors: Akihiro Akiyama, Makinohara (JP); Masasuke Uchiyama, Makinohara (JP)

(73) Assignee: NOK CORPORATION (JP)

( * ) Notice: Subject to any disclaimer, the term of this patent is extended or adjusted under 35 U.S.C. 154(b) by 200 days.

(21) Appl. No.: 17/641,118

(22) PCT Filed: Jul. 30, 2020

(86) PCT No.: PCT/JP2020/029312
§ 371 (c)(1),
(2) Date: Mar. 8, 2022

(87) PCT Pub. No.: WO2021/079585
PCT Pub. Date: Apr. 29, 2021

(65) Prior Publication Data
US 2022/0333689 A1   Oct. 20, 2022

(30) Foreign Application Priority Data
Oct. 21, 2019   (JP) .................... 2019-191731

(51) Int. Cl.
*F16J 15/10* (2006.01)
(52) U.S. Cl.
CPC ................. *F16J 15/104* (2013.01)
(58) Field of Classification Search
CPC .... F16J 15/104; F16J 15/3204; F16J 15/3216; F16J 15/3268
See application file for complete search history.

(56) References Cited

U.S. PATENT DOCUMENTS 4,289,321 A * 9/1981 Cather, Jr. ........... F16J 15/3284
277/560
4,546,987 A   10/1985 Bucher et al.
(Continued)

FOREIGN PATENT DOCUMENTS

EP   0615086 A1 * 9/1994 ............. F16J 5/3252
EP   2927541 A1   10/2015
(Continued)

OTHER PUBLICATIONS

International Search Report (English and Japanese) issued in PCT/JP2020/029312, Sep. 8, 2020; ISA/JP (7 pages).
(Continued)

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A gasket is provided that can be easily assembled into an annular gap. The gasket is inserted from one end side toward the other end side of a shaft member into an annular gap between a housing and a shaft member at least partially inserted into the housing. The gasket includes a cylindrical main body portion inserted into the housing and fixed to the housing, and a seal portion extending from an inner peripheral surface of the main body portion and abutting on an outer peripheral surface of the shaft member. The seal portion is composed of a protrusion extending in the entire circumferential direction and protruding inward in the radial direction at an intermediate portion in the insertion direction in the inner peripheral surface of the main body portion.

5 Claims, 9 Drawing Sheets

(56) References Cited

U.S. PATENT DOCUMENTS

| | | | | |
|---|---|---|---|---|
| 4,553,761 | A * | 11/1985 | Blesing | F16J 15/164 277/553 |
| 5,639,099 | A * | 6/1997 | Booker | F16J 15/3252 464/131 |
| 5,873,576 | A * | 2/1999 | Dietle | F16J 15/164 277/587 |
| 6,003,872 | A * | 12/1999 | Nord | G01M 3/183 277/321 |
| 6,036,192 | A * | 3/2000 | Dietle | F16J 15/3244 277/587 |
| 6,575,471 | B1 * | 6/2003 | Grosspietsch | F16J 15/3236 277/436 |
| 6,609,716 | B2 * | 8/2003 | Friend | F16J 15/3232 277/552 |
| 7,798,496 | B2 * | 9/2010 | Dietle | F16J 15/3208 277/349 |
| 9,062,734 | B2 * | 6/2015 | Yamashita | F16F 9/5126 |
| 11,148,649 | B2 * | 10/2021 | Owada | F16J 15/3204 |
| 2003/0116920 | A1 * | 6/2003 | Friend | F16J 15/164 277/550 |
| 2005/0093246 | A1 * | 5/2005 | Dietle | F16J 15/3244 277/549 |
| 2005/0272508 | A1 * | 12/2005 | Matsui | F16J 15/3232 464/133 |
| 2010/0181761 | A1 | 7/2010 | Santi et al. | |
| 2011/0233873 | A1 * | 9/2011 | Callies | F16J 15/3268 277/549 |
| 2019/0055989 | A1 * | 2/2019 | Hamada | F16C 19/52 |

FOREIGN PATENT DOCUMENTS

| | | |
|---|---|---|
| JP | S52-006816 U | 1/1977 |
| JP | S61-004092 U | 1/1986 |
| JP | H07-004957 U | 1/1995 |
| JP | H11-270686 A | 10/1999 |
| JP | 2002-188768 A | 7/2002 |
| JP | 2007-232317 A | 9/2007 |
| JP | 2008-298155 A | 12/2008 |
| JP | 2010-533827 A | 10/2010 |
| JP | 2014-035008 A | 2/2014 |
| JP | 2015-152042 A | 8/2015 |
| JP | 2015-197176 A | 11/2015 |
| JP | 2018-132078 A | 8/2018 |
| JP | 2018-141512 A | 9/2018 |

OTHER PUBLICATIONS

Notice of Reasons for Refusal issued in corresponding Japanese Patent Application No. 2023-043943 dated Jul. 2, 2024, with English translation (9 Pages).

* cited by examiner (a)

(b)

GASKET

CROSS REFERENCE TO RELATED APPLICATIONS

This application is a U.S. National Phase application under 35 U.S.C. 371 of International Application No. PCT/JP2020/029312, filed on Jul. 30, 2020, which claims priority to Japanese Patent Application No. 2019-191731, filed on Oct. 21, 2019. The entire disclosures of the above applications are expressly incorporated by reference herein.

BACKGROUND

Technical Field

The present invention relates to a gasket for sealing an annular gap between a housing and a shaft member inserted into the housing.

Description of the Related Art

Gaskets are mounted on machines in various fields such as automobiles as seal parts which seal the gap between two members which are stationary without relative movement to each other. For example, JP-A-2018-132078 discloses a gasket inserted into an annular gap between a second member (hereinafter referred to as a housing) and a first member inserted into the housing (hereinafter referred to as a shaft member). Such a gasket is intended to exert a sealing function by closely contacting with the inner peripheral surface of the portion of the housing where the shaft member is inserted and the outer peripheral surface of the shaft member, and also called inner and outer diameter seal. The gasket disclosed in JP-A-2018-132078 has a cylindrical gasket main body portion (hereinafter referred to as a main body portion) inserted into the housing, and an annular lip portion (hereinafter referred to as a seal portion) extending from the inner peripheral surface of the main body portion and in contact with the outer peripheral surface of the shaft member. The seal portion has a base end portion connected to the inner peripheral surface of the main body portion and a distal end portion in contact with the outer peripheral surface of the shaft member, and is formed in a tapered cylindrical shape which is reduced in diameter toward the distal end portion from the base end portion. The seal portion has an inner inclined surface and an outer inclined surface inclined in substantially the same direction with respect to the outer peripheral surface of the shaft member.

However, in the gasket of the inner and outer diameter seal type disclosed in JP-A-2018-132078, the seal portion in contact with the outer peripheral surface of the shaft member is constituted by a so-called lip type formed in the tapered cylindrical shape as a whole, and it has a structure easily deformed during insertion into the annular gap between the housing and the shaft member. Therefore, when the gasket is inserted into the annular gap and assembled (mounted), for example, the seal portion is deformed into an unintentional shape, as a result, the seal portion (e.g., the top of the seal portion) may be not located on the intended seal surface and may fall off the seal surface. As a result, for example, if the gasket after assembled has been deformed to the unintentional shape, the operator or the like must redo the assembling operation. Therefore, in the gasket disclosed in JP-A-2018-132078, a device for preventing the seal portion from falling off from the intended seal surface in the assembling operation to the annular gap may be required.

Therefore, the present invention is intended to provide a gasket that can be easily assembled into an annular gap.

SUMMARY

According to one aspect of the present invention, a gasket is provided that is inserted from one end side toward the other end side of a shaft member into an annular gap between a housing and the shaft member at least partially inserted into the housing. The gasket includes a cylindrical main body portion which is inserted into the housing and fixed to the housing, and a seal portion which extends from an inner peripheral surface of the main body portion and abuts on an outer peripheral surface of the shaft member. The seal portion is composed of a protrusion extending in the entire circumferential direction and protruding inward in the radial direction at an intermediate portion in the insertion direction in the inner peripheral surface of the main body portion.

Effect of the Invention

According to one aspect of the present invention, a gasket that can be easily assembled into an annular gap can be provided.

DETAILED DESCRIPTION

Embodiments of the present invention will be described below with reference to the accompanying drawings.

Figure 1:
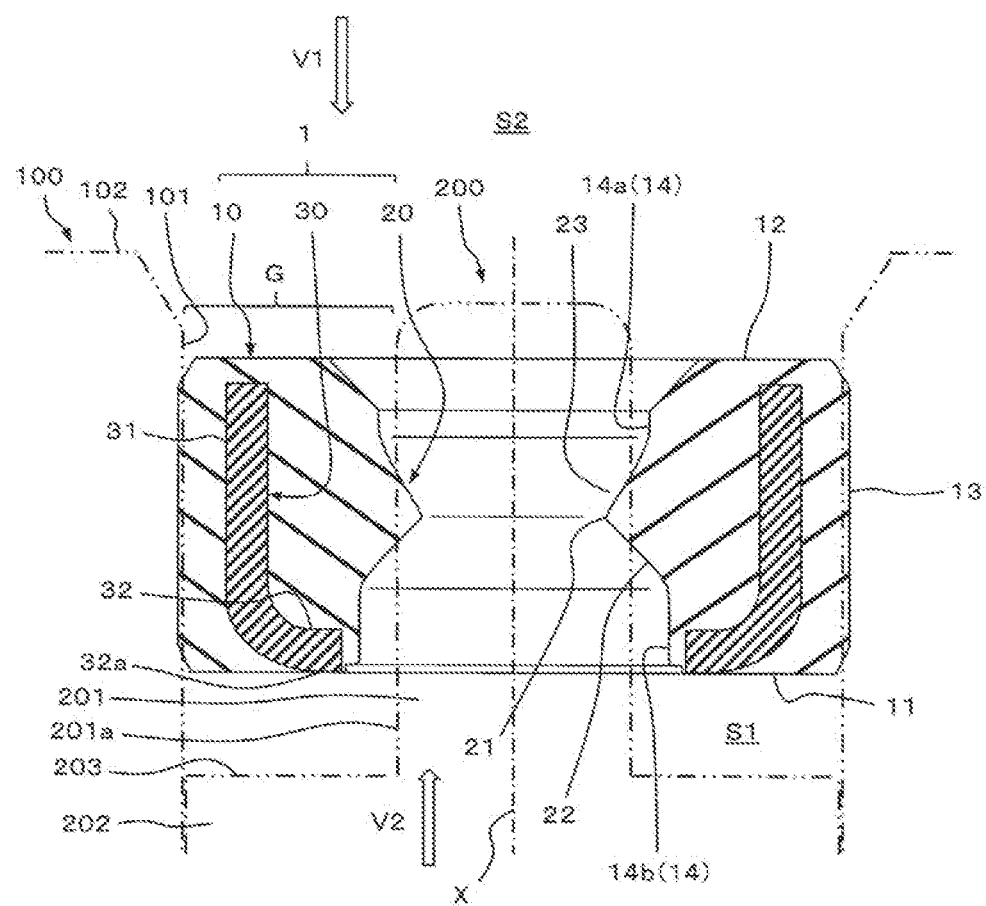
FIG. 1 is a cross-sectional view of a gasket according to an embodiment of the present invention.
Figure 2:
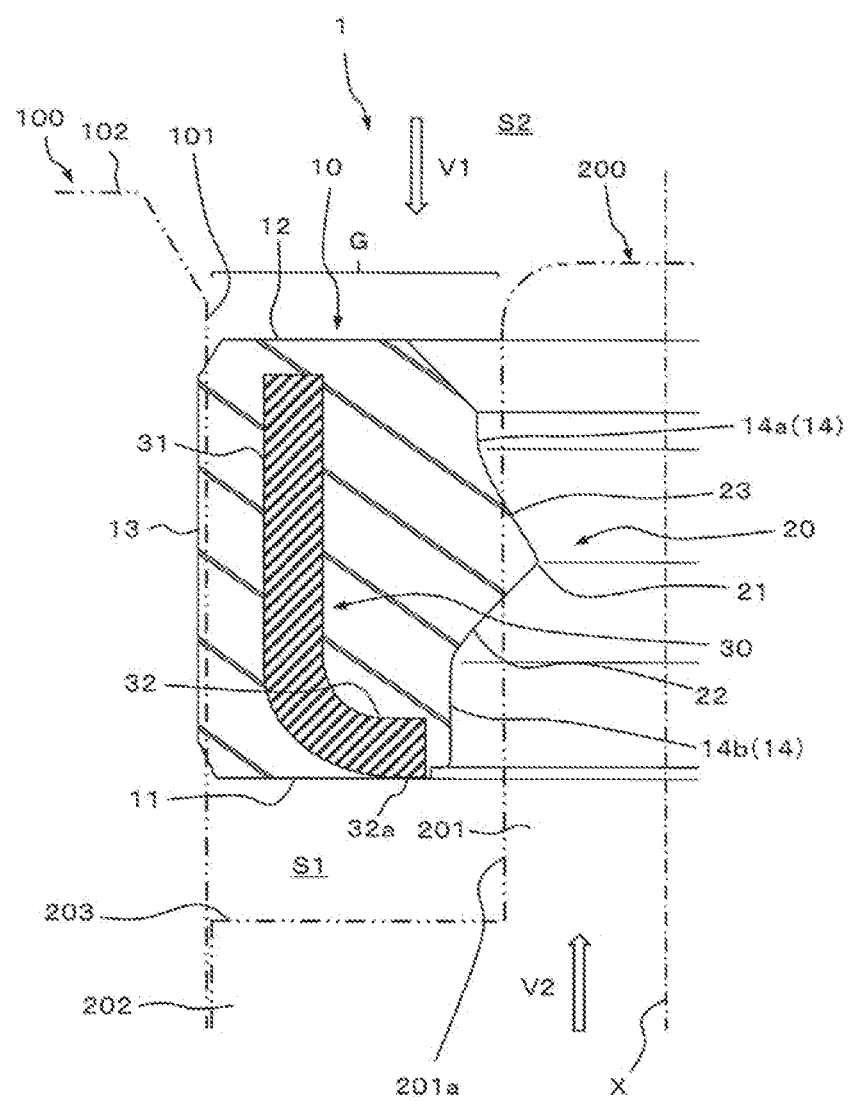
FIG. 2 is a partial cross-sectional view of the gasket.

FIG. 1 is a cross-sectional view of a gasket 1 of the present embodiment. FIG. 2 is a partially enlarged cross-sectional view of the gasket 1. In FIGS. 1 and 2, a part of the machine to which the gasket 1 is mounted is shown by a two-dot chain line, and the gasket 1 is shown in a state before mounting (i.e., before elastic deformation) for simplicity of the drawing.

(Gasket Overview and Mounting Object)

The gasket 1 is mounted in an annular gap G between two members (100, 200) which are stationary without relative movement to each other in various machines such as automobiles, motorcycles, and general industrial machines, and is used to prevent the outflow of fluid in the machine. The two members are a housing 100 and a shaft member 200. For example, in the housing 100, a shaft hole 101 having a circular cross section is formed, a pillar shaft member 200 is inserted into the shaft hole 101. An example of the machines of the mounting object of the gasket 1 is an oil pump for CVT (Continuously Variable Transmission) of automobiles. The oil pump has the housing 100 and the shaft member 200, and an annular gap G is provided between the shaft hole 101 and the shaft member 200. The housing 100 and the shaft member 200 is stationary without relative movement to each other in the extending direction of the axis X and the rotation direction around the axis X, of the shaft member 200.

Thus, the gasket 1 is intended to be inserted into the annular gap G between the housing 100 and the shaft member 200 at least partially inserted into the housing 100, and is a seal part of the so-called inner and outer diameter seal type. The gasket 1 is inserted into the annular gap G and mounted on the machine, so that an internal space S1 of the machine is defined. The internal space S1 communicates with a region in which a fluid (oil, in the present embodiment), which is a sealing object of the gasket 1, exists, and the gasket 1 blocks a communication with an atmospheric region S2. The pressure in the internal space S1 is higher than the pressure in the atmospheric region S2 during the operation of CVT and the like.

FIG. 1 shows a portion including an opening at one end side of the shaft hole 101 in the housing 100, and one end of the shaft hole 101 is open to one end face 102 of the housing 100. In the present embodiment, one end portion of the shaft member 200 is positioned in the portion of one end side of the shaft hole 101 (i.e., the portion of one end face 102 side of the housing 100 in the shaft hole 101), and the shaft member 200 is inserted into the shaft hole 101 with the axis X substantially aligned with the center of the hole in the shaft hole 101. Although not particularly limited, in the present embodiment, one end portion of the shaft member 200 has a small diameter portion 201 and a large diameter portion 202 which is located on the other end portion side of the shaft member 200 than the small diameter portion 201 and has an outer diameter larger than the outer diameter of the small diameter portion 201, and it is formed in a stepped shape. The distal end face of the small diameter portion 201 of the shaft member 200 (i.e., one end face of the shaft member 200) is located slightly on the internal space S1 side than the one end face 102 of the housing 100. Then, the outer diameter of the large diameter portion 202 of the shaft member 200 is set slightly smaller than the inner diameter of the shaft hole 101.

In the present embodiment, the annular gap G between the housing 100 and the shaft member 200 is formed between the portion of the one end face 102 side in the inner peripheral surface of the shaft hole 101 of the housing 100 and the outer peripheral surface 201a of the small diameter portion 201 in one end portion of the shaft member 200. The gasket 1 is inserted from one end side toward the other end side of the shaft member 200 into the annular gap G. That is, the insertion direction V1 to the annular gap G of the gasket 1 is parallel to the axis X of the shaft member 200. Then, the end face of the distal end side in the insertion direction V1 in the gasket 1 (the end face 32a of the inward flange portion 32 of the distal end face 11 and the reinforcing ring 30 of the main body portion 10 to be described later) is opposed to an annular end face 203 of the small diameter portion 201 side in the large diameter portion 202 of the shaft member 200, and the rear end face in the insertion direction V1 in the gasket 1 (the rear end face 12 of the main body portion 10 to be described later) is opposed to the annular end face 203. Specifically, in the present embodiment, the gasket 1 is inserted into the housing 100 through an insertion port composed of an opening at one end side of the shaft hole 101 in one end face 102 of the housing 100. Although not particularly limited, more specifically, the gasket 1 is inserted from the insertion port composed of the opening at one end side of the shaft hole 101 in the one end face 102 of the housing 100, thereafter, in this state, the small diameter portion 201 of the shaft member 200 is inserted into the gasket 1 from the distal end side in the insertion direction V1 in the gasket 1 (the end face 32a side of the inward flange portion 32 of the distal end face 11 side and the reinforcing ring 30 of the main body portion 10 to be described later). As a result, the gasket 1 is in a state of being inserted into the annular gap G. In the present embodiment, the insertion direction V1 of the gasket 1 and the insertion direction V2 of the shaft member 200 are opposite to each other. In other words, the gasket 1 is inserted from the atmosphere side into the shaft hole 101 of the housing 100, while the shaft member 200 is inserted from the inside of the machine side into the shaft hole 101 of the housing 100.

(Schematic Configuration of the Gasket)

The gasket 1 is configured to include a cylindrical main body portion 10 and a seal portion 20. The main body portion 10 and the seal portion 20 are integrally molded, which is made of an elastic material. As the elastic material, a material such as rubber or a thermoplastic elastomer is used.

The main body portion 10 is a portion which is inserted into the housing 100 and fixed to the housing 100, and is formed in a substantially cylindrical shape.

The distal end face 11 which is an end face of the distal end side in the insertion direction V1 in the main body portion 10 (in other words, the end face to be first inserted into the annular gap G) and the rear end face 12 which is an end face of the rear side in the insertion direction V1 in the main body portion 10 are parallel to each other and extend in a direction perpendicular to the axis X.

The distal end face 11 of the main body portion 10 is opposed to the annular end face 203 of the large diameter portion 202 of the shaft member 200, and is formed as a flat annular surface. In the present embodiment, the insertion depth of the gasket 1 into the annular gap G (e.g., the distance in the extending direction of the axis X between the one end face 102 of the housing 100 and the distal end face 11 of the main body portion 10) is set so as to form a gap between the distal end face 11 of the main body portion 10 and the annular end face 203 of the large diameter portion 202. The internal space S1 described above is partitioned by the distal end face 11, the annular end face 203, the inner peripheral surface of the shaft hole 101, and the outer peripheral surface 201a of the small diameter portion 201 of the shaft member 200.

The rear end face 12 of the main body portion 10 faces the opposite side to the annular end face 203, and is formed as a flat annular surface.

The outer peripheral surface 13 of the main body portion 10 is composed of a cylindrical surface extending in parallel with the axis X, and the outer diameter of the main body portion 10 is set slightly larger than the inner diameter of the shaft hole 101. In a state where the gasket 1 is inserted into the annular gap G, the main body portion 10 is elastically deformed and its outer peripheral surface 13 is in close contact with the inner peripheral surface of the shaft hole 101. As a result, the main body portion 10 is fixed to the housing 100.

In the inner peripheral surface 14 of the main body portion 10, the seal portion 20 is protruded as described later. The inner diameter of the portion except the protrusion region of the seal portion 20 in the inner peripheral surface 14 of the main body portion 10 is set to be larger than the outer diameter of the small diameter portion 201 of the shaft member 200.

The seal portion 20 is a portion that extends from the inner peripheral surface 14 of the main body portion 10 and abuts on the outer peripheral surface 201a of the shaft member 200 (the small diameter portion 201, in the present embodiment). That is, the outer peripheral surface 201a of the shaft member 200 is a seal surface. The forming position and the shape of the seal portion 20 will be described in detail later.

In a state in which the gasket 1 is inserted into the annular gap G, the seal portion 20 elastically deforms so that the portion including the distal end portion (the top 21 of the seal portion 20 to be described later) comes into close contact with the outer peripheral surface 201a of the small diameter portion 201, and the outer peripheral surface 13 of the main body portion 10 comes into close contact with the inner peripheral surface of the shaft hole 101, as described above. In this way, the gasket 1 of the so-called inner and outer diameter seal type for sealing the annular gap G between the inner peripheral surface of the shaft hole 101 of the housing 100 (in other words, the inner peripheral surface of the housing 100) and the outer peripheral surface 201a of the small diameter portion 201 of the shaft member 200 is configured.

In the present embodiment, a reinforcing ring 30 is buried in an integrally molded product of the main body portion 10 and the seal portion 20. The reinforcing ring 30 is a member for mainly reinforcing and supporting the main body portion 10, and is located in the main body 10. In other words, the main body portion 10 extends substantially along the reinforcing ring 30 and is adhesively attached to the surface of the reinforcing ring 30. The reinforcing ring 30 is made of, for example, a metal material, and is formed by press working. As the metal material, a predetermined material selected from the plate-like material group such as stainless steel, SPCC or SPHC is used.

The reinforcing ring 30 has, for example, a substantially L-shaped cross section and is formed in an annular shape around the axis X. The reinforcing ring 30 includes a cylindrical portion 31 and an inward flange portion 32, and these portions 31 and 32 are integrally molded.

The cylindrical portion 31 is formed in a cylindrical shape, and is located between the outer peripheral surface 13 and the inner peripheral surface 14 of the main body portion 10 and between the distal end face 11 and the outer end face portion 12a of the rear end face 12 of the main body portion 10. Specifically, the cylindrical portion 31 is provided at a position closer to the outer peripheral surface 13 side in the main body portion 10.

The inward flange portion 32 is a portion of the flange-shaped (annular) extending substantially inward in the radial direction from the end portion of the distal end face 11 side of the main body portion 10 to the front of the inner peripheral surface 14 of the main body portion 10 in the cylindrical portion 31. In the present embodiment, the end face 32a of the distal end face 11 side of the main body portion 10 in the thickness direction in the inward flange portion 32 is, for example, exposed to the internal space S1. In addition, the end face 32a of the inward flange portion 32 cooperates with the distal end face 11 of the main body portion 10 to constitute an end face of the distal end side in the insertion direction V1 in the gasket 1. Incidentally, the end face 32a of the distal end face 11 side of the flange portion 32 may not be exposed to the internal space S1.

(Detailed Structure of the Gasket)

Next, a detailed structure of the gasket 1 according to the present embodiment will be described.

The seal portion 20 is composed of a protrusion extending in the entire circumferential direction and protruding inward in the radial direction at an intermediate portion in the insertion direction V1 in the inner peripheral surface 14 of the main body portion 10. The "protrusion" is a solid portion that protrudes from a flat surface and extends elongated, so-called a bead. That is, the bead-type seal portion 20 composed of the protrusion has a completely different shape from the so-called lip-type conventional seal portion formed in a tapered cylindrical shape.

Specifically, the seal portion 20 is configured to include a top 21, a first inclined surface 22, and a second inclined surface 23, and is formed in an annular shape as a whole. In the present embodiment, the seal portion 20 extends elongated over the entire circumferential direction of the main body portion 10 (around the axis X) having a substantially chevron cross section having a top 21 inward in the radial direction. The inner diameter of the seal portion 20 is set smaller than the outer diameter of the small diameter portion 201 of the shaft member 200 so that the gasket 1 is elastically deformed at a predetermined tightening margin.

The top 21 is a portion that abuts on the outer peripheral surface 201a of the small diameter portion 201 of the shaft member 200, and is also a top of a protruded chevron. In the present embodiment, the top 21 is smoothly curved, and smoothly connects the first inclined surface 22 and the second inclined surface 23.

The first inclined surface 22 is a slope of the distal end face 11 side of the main body portion 10 in the seal portion 20 of a substantially chevron cross section (i.e., the distal end side in the insertion direction V1 in the seal portion 20). In other words, the first inclined surface 22 is inclined so as to be more distant in the radial direction toward the distal end face 11 side from the top 21 with respect to the outer peripheral surface 201a of the small diameter portion 201 of the shaft member 200.

The second inclined surface 23 is a slope of the rear end face 12 side of the main body portion 10 in the seal portion 20 (i.e., the rear side in the insertion direction V1 in the seal portion 20). In other words, the second inclined surface 23 is inclined so as to be more distant in the radial direction toward the rear end face 12 side from the top 21 with respect to the outer peripheral surface 201a of the small diameter portion 201.

Thus, the seal portion 20 has a solid substantially chevron cross section. Specifically, the seal portion 20 of the protrusion has a solid cross section having slopes (the first inclined surface 22 and the second inclined surface 23) which extend respectively on both sides of the top 21 in the extending direction of the axis X, and has a predetermined width in the extending direction of the axis X around the top 21. Therefore, the seal portion 20 of the protrusion has a structure in which the shape is relatively stable and the seal portion is supported relatively stable with respect to the main body portion 10 when compared with the conventional lip-type seal portion which is easily elastically deformable and unstable.

Further, in the present embodiment, the rear inner peripheral surface portion 14a, which is a portion of the rear (the rear end face 12 side) in the insertion direction V1 from the seal portion 20 in the inner peripheral surface 14 of the main body portion 10, is located inward in the radial direction with respect to the front inner peripheral surface portion 14b, which is the portion of the front (the distal end face 11 side)

in the insertion direction V1 from the seal portion 20 in the inner peripheral surface 14 of the main body portion 10. That is, the inner diameter of the rear inner peripheral surface portion 14a is smaller than the inner diameter of the front inner peripheral surface portion 14b. In the present embodiment, the rear inner peripheral surface portion 14a and the front inner peripheral surface portion 14b are formed of cylindrical surfaces extending in parallel with each other and extending in parallel with the outer peripheral surface 201a of the shaft member 200 (the small diameter portion 201). Then, the rear inner peripheral surface portion 14a and the top 21 are connected by the second inclined surface 23, and the top 21 and the front inner peripheral surface portion 14b is connected by the first inclined surface 22. The connecting portion between the rear inner peripheral surface portion 14a and the second inclined surface 23 is smoothly curved, and the connecting portion between the front inner peripheral surface portion 14b and the first inclined surface 22 is also smoothly curved.

Figure 3:
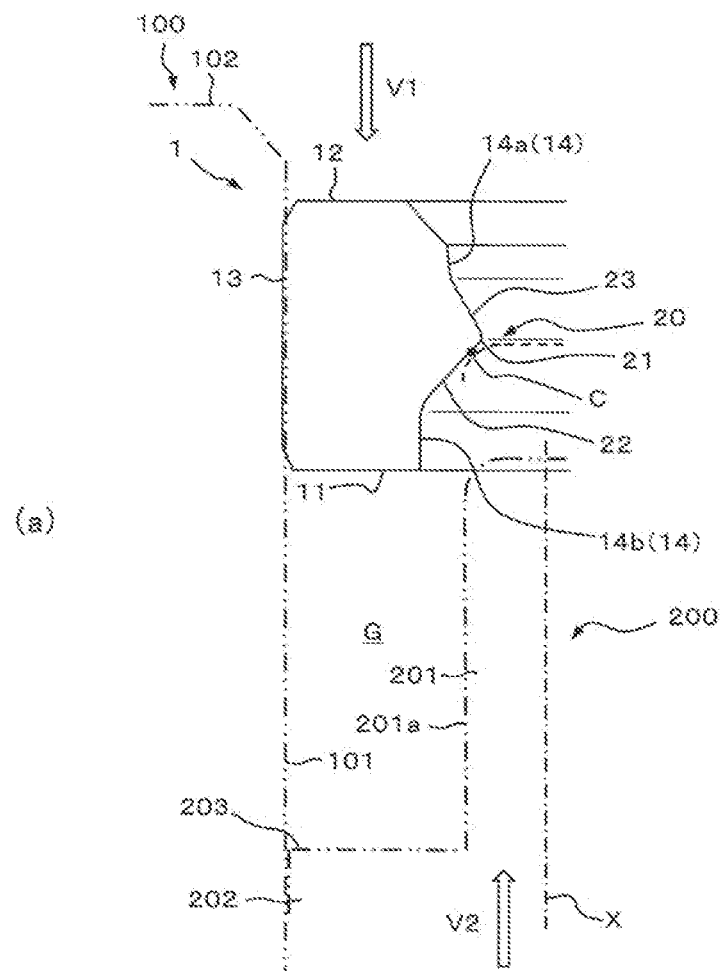
FIG. 3 is a conceptual diagram for explaining a state of the gasket before and after assembling.
Figure 3:
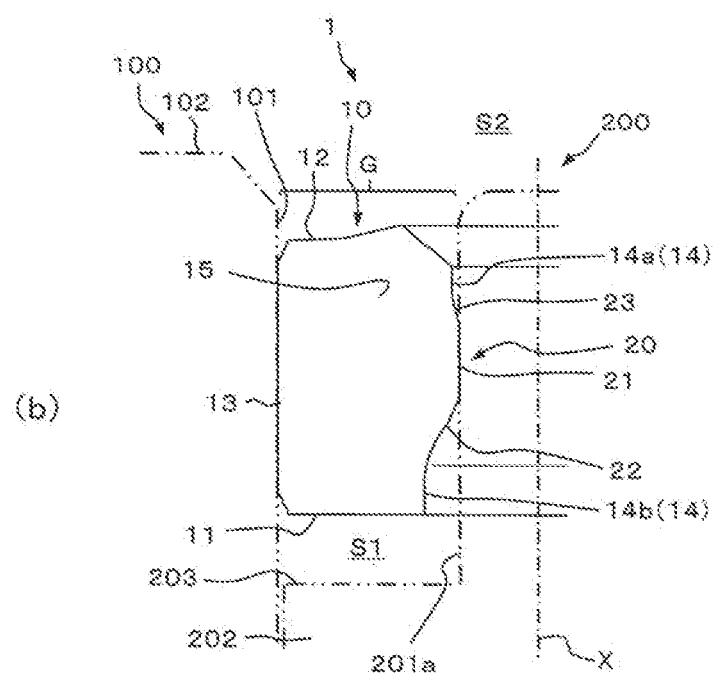

Next, the state when the gasket 1 is inserted into the annular gap G and assembled will be described with reference to FIG. 3. FIG. 3 is a conceptual diagram for explaining the elastic deformation of the gasket 1. FIG. 3 (a) shows the state before assembling (before mounting) of the gasket 1, and FIG. 3 (b) shows the state after assembling (after mounting) of the gasket 1. In the state shown in FIG. 3 (b), the pressure of the internal space S1 is assumed to be about the same as the pressure of the atmospheric region S2. For simplicity of the drawing, the reinforcing ring 30 is omitted.

The operator or the like makes the distal end face 11 of the main body portion 10 of the gasket 1 face the annular end face 203 of the shaft member 200 for assembling by inserting the gasket 1 into the shaft hole 101 of the housing 100. At this time, the distal end face 11 of the main body portion 10 of the gasket 1 is located in the vicinity of the insertion port composed of an opening at one end side of the shaft hole 101 at one end face 102 of the housing 100. In this state, the gasket 1 is pressed from one end side (the upper side in the drawing) toward the other end side (the lower side in the drawing) of the shaft member 200 by a jig which is not shown. Thus, as the gasket 1 shown by a solid line in FIG. 3 (a), the gasket 1 is inserted in the insertion direction V1 from one end side toward the other end side of the shaft member 200 as indicated by a void arrow in the shaft hole 101 of the housing 100.

During insertion into the shaft hole 101, the portion of the distal end face 11 side of the main body portion 10 of the gasket 1 is inserted (pushed) first. At this time, the main body portion 10 begins to elastically deform in a shape matching the inner peripheral surface of the shaft hole 101, and the outer peripheral surface 13 of the main body portion 10 slides along the inner peripheral surface of the shaft hole 101. Then, the gasket 1 is finally inserted to a predetermined insertion depth determined by the jig. On the other hand, the inner peripheral surface 14 of the main body portion 10 (specifically, the front inner peripheral surface portion 14b) is not in contact with the outer peripheral surface 201a of the shaft member 200.

In the present embodiment, after the gasket 1 is inserted to the predetermined insertion depth as shown in FIG. 3 (a), the shaft member 200 begins to be inserted by being pressed in the insertion direction V2 opposite to the insertion direction V1 of the gasket 1 as shown by a two-dot chain line by the jig which is not shown. When the shaft member 200 is further inserted, the corner portion chamfered with R-shape in the distal end face side of the small diameter portion 201 as shown by a broken line in FIG. 3 (a) abuts on the first inclined surface 22 of the seal portion 20. Then, when the shaft member 200 is further deeply inserted from the state shown by a broken line in FIG. 3 (a), the seal portion 20 of the gasket 1 begins to be elastically deformed. Specifically, the position of the contact point C with the small diameter portion 201 in the first inclined surface 22 of the seal portion 20 gradually approaches the top 21 side in the process of the insertion. As a result, as the shaft member 200 is inserted, the tightening margin (compression amount) of the seal portion 20 outward in the radial direction increases, the seal portion 20 is gradually crushed outward in the radial direction and is pressed so as to be distorted toward the rear end face 12 side (the rear side in the insertion direction V1), the portion including the seal portion 20 is elastically deformed to be flat. The tightening margin of the seal portion 20 outward in the radial direction increases until the top 21 of the seal portion 20 reaches the position of the outer peripheral surface 201a of the small diameter portion 201. After the top 21 of the seal portion 20 reaches the position of the outer peripheral surface 201a of the small diameter portion 201 (the position of the seal surface), the shaft member 200 is inserted further deeply. Then, as shown in FIG. 3 (b), the shaft member 200 is finally inserted to a position determined by the jig. Thus, the assembling of the gasket 1 to the annular gap G is completed. In the process of elastic deformation of the seal portion 20, the seal portion 20 of the gasket 1 is compressed outward in a substantially radial direction and elastically deformed to be flat like a so-called O-ring, and the seal portion 20 is in close contact with the outer peripheral surface 201a of the shaft member 200 in a substantially intended position, range (the seal surface), and shape.

Further, in the assembling process of the gasket 1 (specifically, the insertion process of the shaft member 200), the magnitude of the insertion load required for insertion of the shaft member 200 gradually increases from the initial stage of insertion, reaches a predetermined maximum insertion load, and then gradually decreases to a predetermined intermediate value. After the magnitude of the insertion load required for insertion has decreased to the predetermined intermediate value, even if the insertion depth becomes deeper, the magnitude of the insertion load required for insertion is fixed at a substantially intermediate value without changing.

According to the gasket 1 according to the present embodiment, since the seal portion 20 is a so-called bead type composed of a protrude, it has a structure in which the shape is relatively stable and the seal portion is supported relatively stable with respect to the main body portion 10 when compared with the conventional lip-type seal portion which is easily elastically deformable and unstable. Therefore, in the process of the elastic deformation of the seal portion 20, the seal portion 20 comes into close contact with the outer peripheral surface 201a of the shaft member 200 in a substantially intended position, range (seal surface), and shape. Therefore, the top 21 of the seal portion 20 reliably abuts on the intended seal surface (that is, the outer circumferential surface 201a of the shaft member 200), and as a result, the top 21 of the seal portion 20 is reliably prevented from falling off from the seal surface. Then, redo of the assembling operation that may occur in a gasket having a conventional lip-type seal portion may be reduced or eliminated, and the man-hours of the assembling operation may be reduced. In this way, a gasket 1 that can be easily assembled in the annular gap G is provided.

In the present embodiment, the reinforcing ring 30 is buried in the main body portion 10. Thus, the main body portion 10 is supported stably, as a result, the support of the seal portion 20 is stabilized, and the elastic deformation of the seal portion 20 is also stabilized. Therefore, the top 21 of the seal portion 20 is reliably prevented from falling off from the seal surface, and the man-hours of the assembling operation may be effectively reduced.

Figure 4:
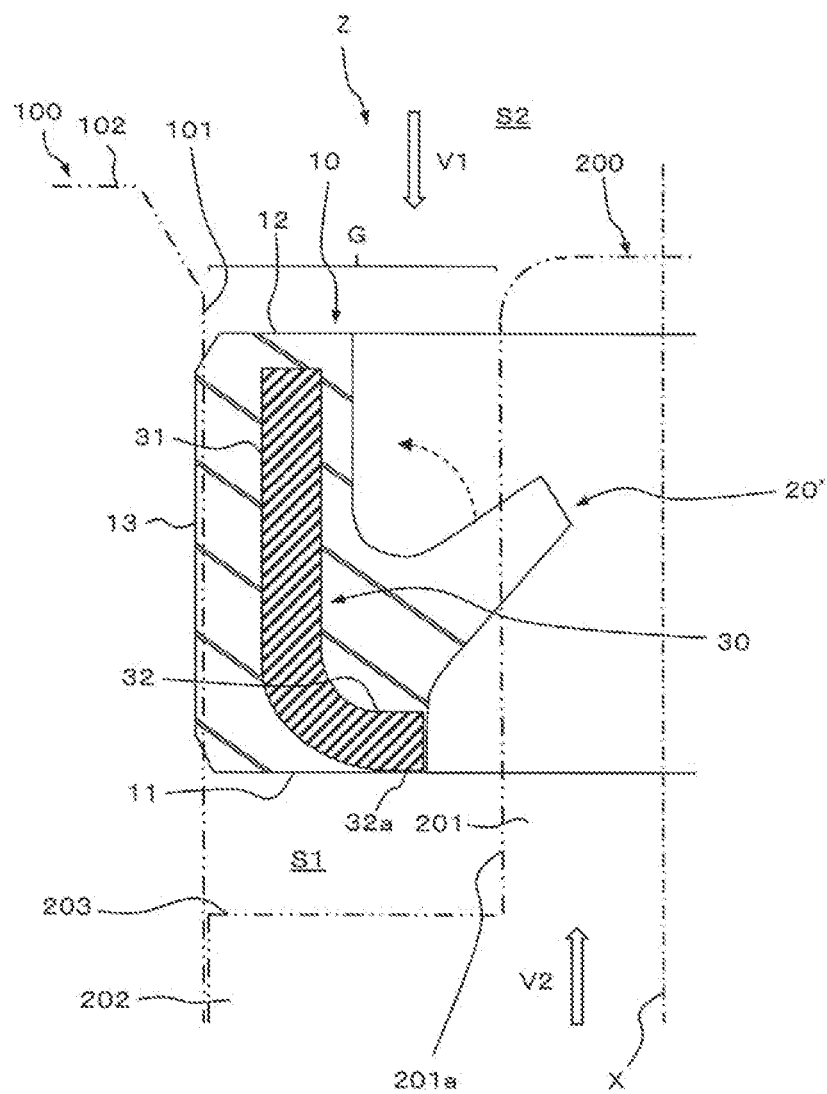
FIG. 4 is a partial cross-sectional view of a reference gasket of the gasket.

Here, FIG. 4 is a partial cross-sectional view of the gasket Z of reference for comparing with the gasket 1 of the present embodiment. In the reference gasket Z, only the shape of the seal portion 20' is different from the seal portion 20 of the gasket 1. In the reference gasket Z, the seal portion 20' is a tapered cylindrical lip type as in the prior art. When the insertion direction V1 of the gasket Z and the insertion direction V2 of the shaft member 200 are opposite to each other as in this embodiment, it is necessary to place the gasket Z so that the distal end portion of the tapered cylindrical seal portion 20' faces the distal end side of the insertion direction V2 of the shaft member 200, i.e., the upper in FIG. 4, considering the insertion of the shaft member 200 during the assembling of the reference gasket Z. As a result, when the pressure in the internal space S1 becomes higher than the pressure in the atmospheric region S2 at the time of operation of the CVT or the like, the entire seal portion 20 may be deformed in a direction away from the outer peripheral surface 201a of the shaft member 200 (a direction indicated by a dotted-line arrow in the drawing) by the pressure in the internal space S1, in the reference gasket Z. Then, when the deformation excessively progresses and the distal end portion of the seal portion 20 completely separates from the outer peripheral surface 201a, the fluid to be sealed in the internal space S1 may blow through the atmosphere region S2 and leak out. That is, when the lip-type seal portion 20' is adopted, during the assembling of the gasket, there is a vertical directivity, and it will be restricted about the assembling direction (insertion direction), as a result, the problem of the above-described blowing through may occur. In this regard, since the bead-type the seal portion 20 is adopted in the gasket 1 in the present embodiment, there is basically no vertical directivity during assembling, and the elastic deformation due to the acting of the force in the extending direction of the axis X (i.e., the pressure in the internal space S1) is very slight. As a result, according to the gasket 1 of the present embodiment, it is possible to effectively prevent the above-described blowing through phenomenon caused by the pressure in the internal space S1 from occurring.

(Modified Example)

In the present embodiment, the top 21 of the seal portion 20 is a curved surface, but the present invention is not limited to this. For example, although not shown, the top 21 of the seal portion 20 may be formed of a flat surface extending in parallel with the outer peripheral surface 201a of the shaft member 200. As a result, the width in the axial X direction of the region of the seal portion 20 that contacts the outer peripheral surface 201a of the shaft member 200 (that is, the seal width) can be ensured to be sufficiently large, and the sealing performance can be improved. In addition, the sealing performance and maximum insertion load can be easily fine-adjusted by adjusting the seal width.

Here, since the seal portion 20 of the gasket 1 is a protrusion (i.e., bead type) whose shape is relatively stable, when compared with the seal portion 20 of the conventional lip type, the maximum insertion load for inserting the gasket 1 into the annular gap G may be higher than the maximum insertion load in the case of the lip type. In this regard, the device described in detail below is applied in the gasket 1 according to the modified examples shown in FIGS. 5 to 9 below. That is, a weak portion having low rigidity is provided in a portion of the rear side in the insertion direction V1 in the main body portion 10.

Figure 5:
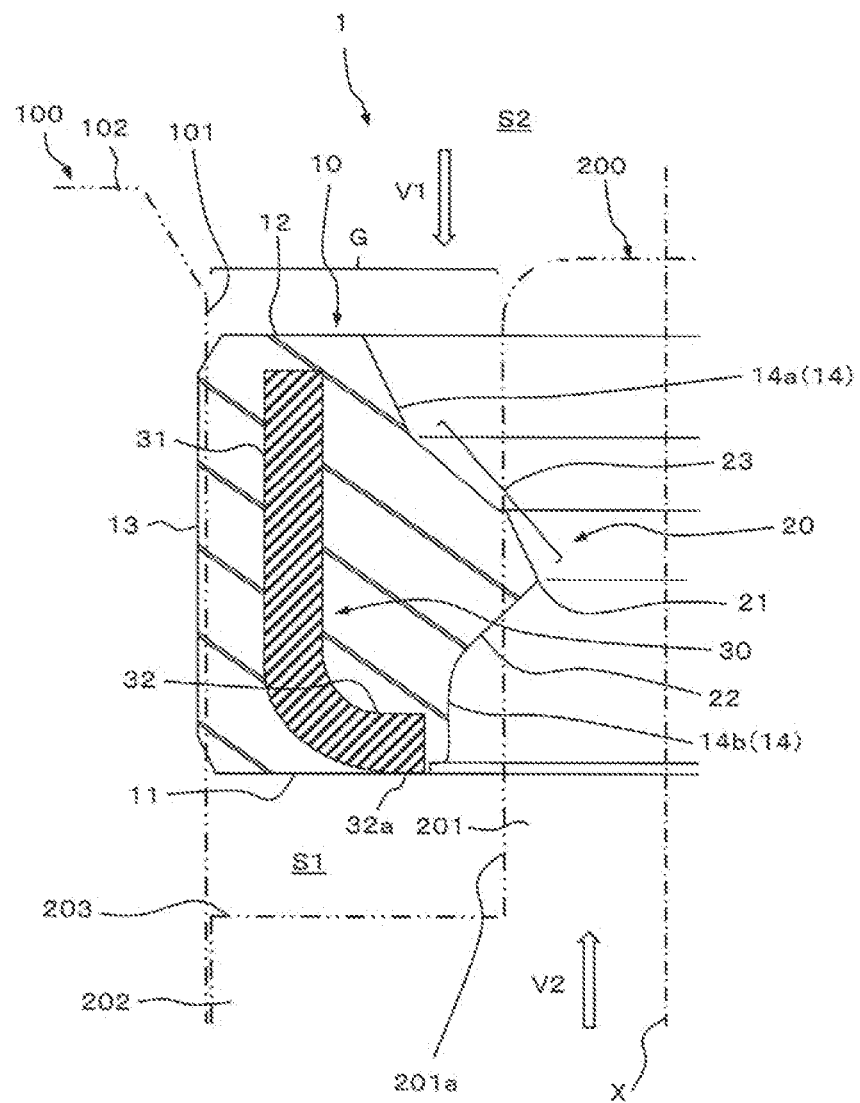
FIG. 5 is a partial cross-sectional view for explaining a modified example of the gasket.
Figure 6:
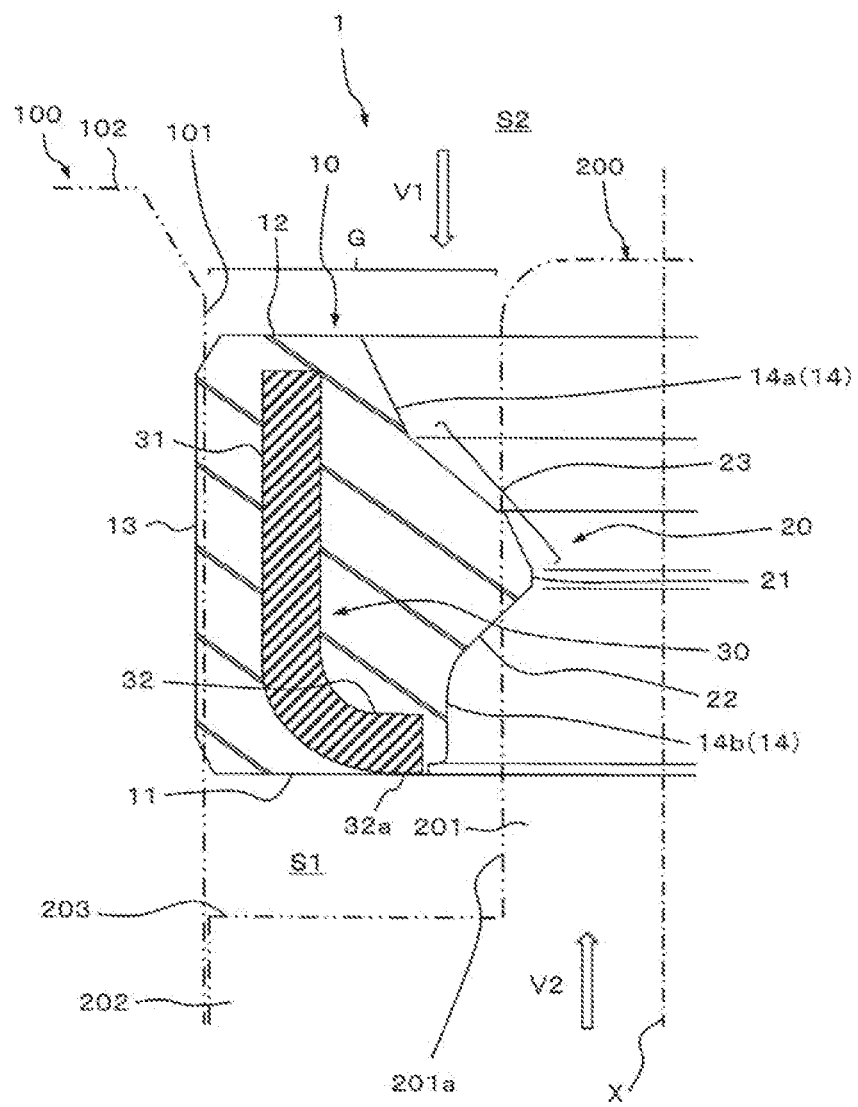
FIG. 6 is a partial cross-sectional view for explaining another modified example of the gasket.

Specifically, in the gasket 1 of the modified example shown in FIG. 5, the rear inner peripheral surface portion 14a in the inner peripheral surface 14 of the main body portion 10 is located outward in the radial direction with respect to the front inner peripheral surface portion 14b in the inner peripheral surface 14 of the main body portion 10, and the rear inner peripheral surface portion 14a is formed as a conical surface having a large diameter that is not parallel to the front inner peripheral surface portion 14b. Thus, in the gasket 1 shown in FIG. 5, the rear portion in the insertion direction V1 in the main body portion 10 is largely recessed outward in the radial direction, and the portion functions as a weak portion. That is, the largely recessed portion has a function of reducing the maximum insertion load for inserting the gasket 1 into the annular gap G. In FIG. 5, the second inclined surface 23 is bent on the way, but the present invention is not limited to this, and the second inclined surface 23 may extend linearly as a whole. As shown in FIG. 6, the top 21 of the seal portion 20 may be formed of a flat surface extending in parallel with the outer peripheral surface 201a of the shaft member 200. As a result, the sealing performance can be improved.

Figure 7:
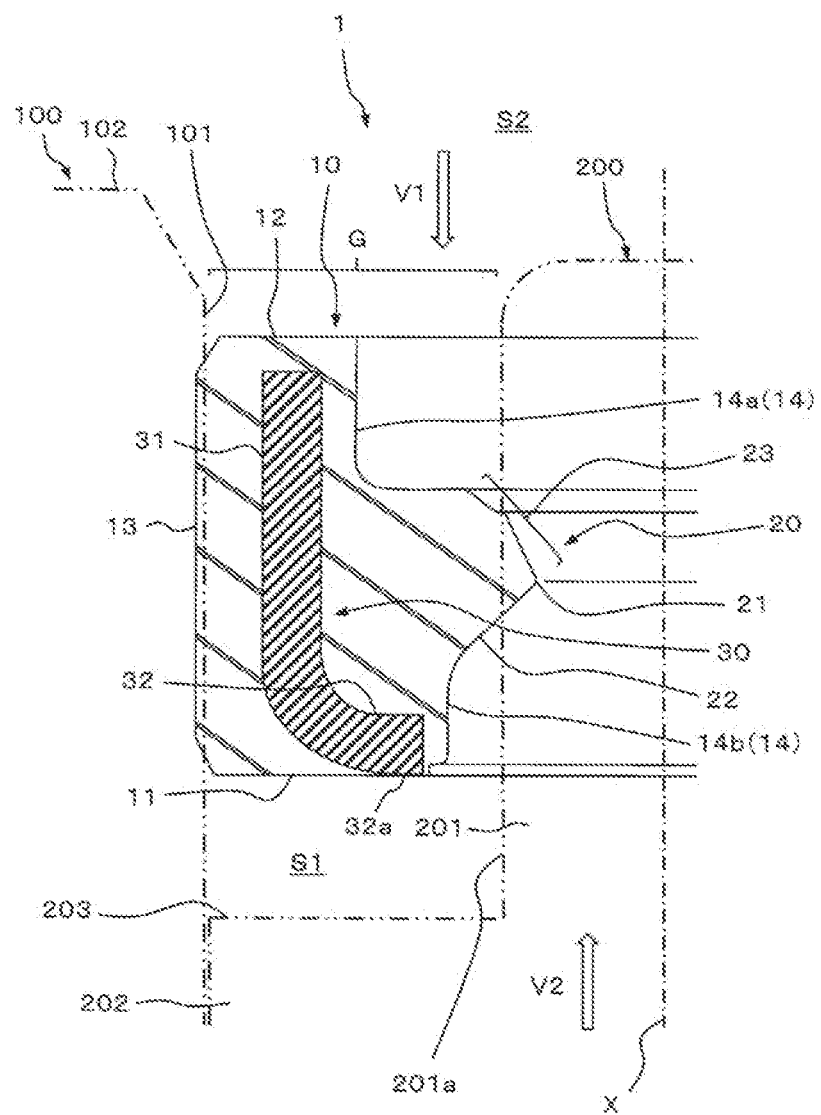
FIG. 7 is a partial cross-sectional view for explaining still another modified example of the gasket.

In the gasket 1 of the modified example shown in FIG. 7, the rear inner peripheral surface portion 14a in the inner peripheral surface 14 of the main body portion 10 is located outward in the radial direction with respect to the front inner peripheral surface portion 14b in the inner peripheral surface 14 of the main body portion 10, similarly to FIGS. 5 and 6. In this gasket 1, the rear inner peripheral surface portion 14a and the front inner peripheral surface portion 14b extend in parallel with each other and are parallel to the outer peripheral surface 201a of the shaft member 200. That is, in the gasket 1 shown in FIG. 7, a weak portion having low rigidity is provided in the portion of the rear side in the insertion direction V1 in the main body portion 10 by recessing the rear portion in the insertion direction V1 in the main body portion 10 largely outward in the radial direction and forming the rear inner peripheral surface portion 14a as a cylindrical surface of a large diameter.

Figure 8:
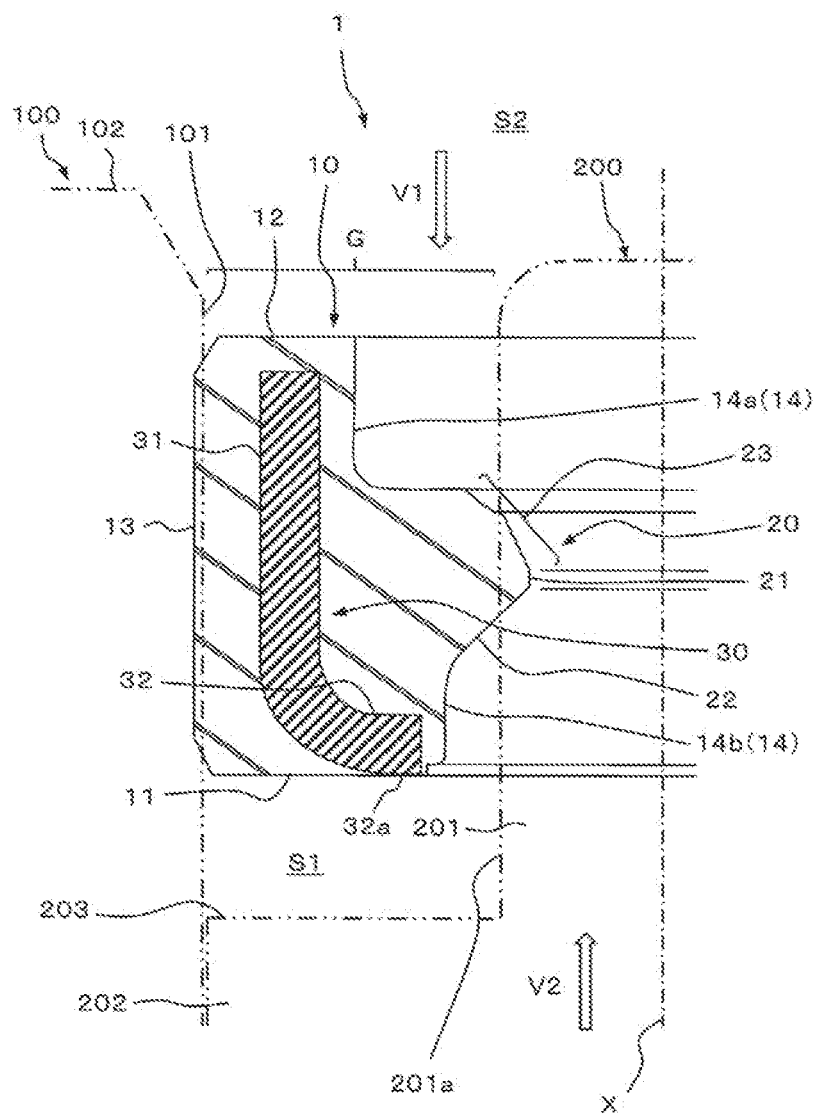
FIG. 8 is a partial cross-sectional view for explaining a gasket having both features of the modified example of FIG. 6 and the modified example of FIG. 7.

The gasket 1 of the modified example shown in FIG. 8 is provided with both the features of the modified example of FIG. 6 and the features of the modified example of FIG. 7. That is, in the gasket 1 of FIG. 8, the top 21 of the seal portion 20 is formed of a flat surface extending in parallel with the outer peripheral surface 201a of the shaft member 200, similarly to FIG. 6. Further, in the gasket 1 of FIG. 8, the rear inner peripheral surface portion 14a and the front inner peripheral surface portion 14b are cylindrical surfaces extending in parallel with each other and being parallel to the outer peripheral surface 201a of the shaft member 200, similarly to FIG. 7, and the rear inner peripheral surface portion 14a has a relatively larger diameter than the front inner peripheral surface portion 14b. In such a form, it is possible to reduce the maximum insertion load when inserting the gasket 1 into the annular gap G by the rear inner peripheral surface portion 14a of relatively larger diameter than the front inner peripheral surface portion 14b, while improving the sealing performance by the top 21 of the seal portion 20 composed of a flat surface.

Figure 9:
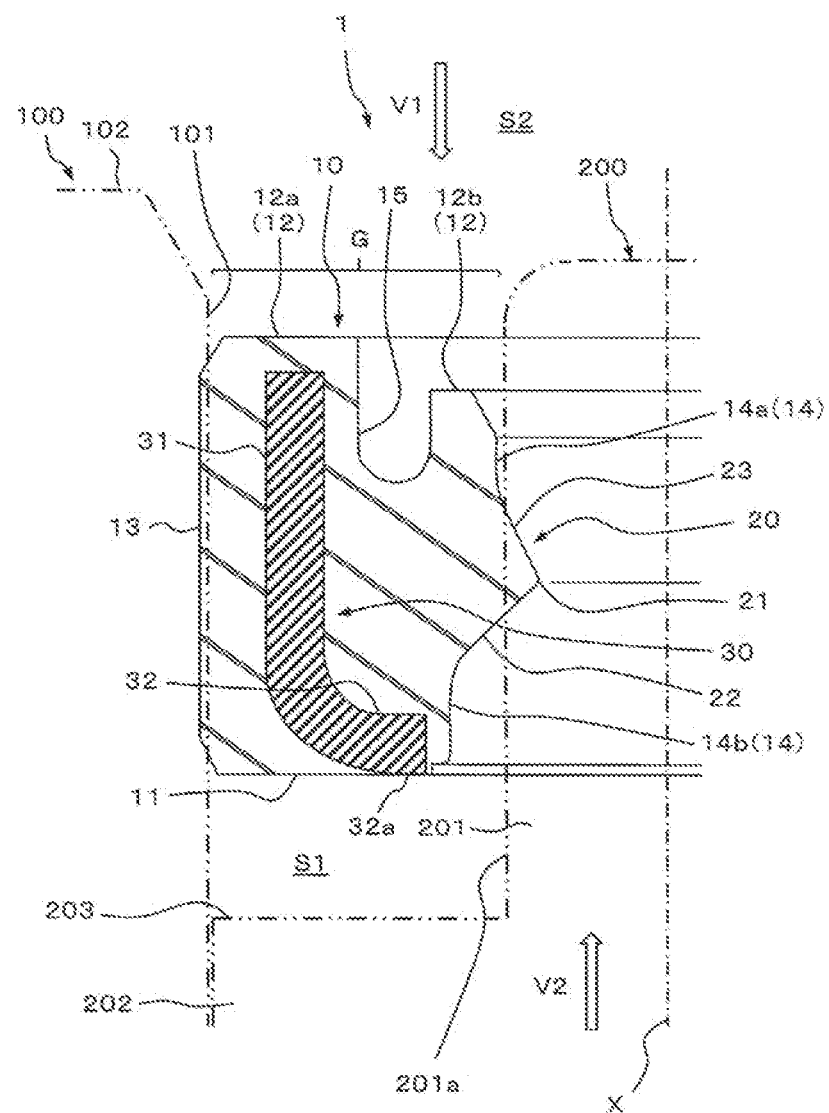
FIG. 9 is a cross-sectional view for explaining a gasket having a groove.

In the gasket 1 of the modified example shown in FIG. 9, a weak portion having low rigidity is provided in the portion of the rear side in the insertion direction V1 in the main body portion 10 by forming a groove 15 on the rear end face 12 of the main body portion 10. Specifically, in the gasket 1 shown in FIG. 9, the rear end face 12 is composed of an outer end face portion 12a in the radial direction and an inner end face portion 12b in the radial direction. The outer end face portion 12a and the inner end face portion 12b are respectively formed as a flat annular surface. A step is formed between the outer end face portion 12a and the inner end face portion 12b, and the inner end face portion 12b is brought closer to the distal end face 11 side. The entire outer end face portion 12a and the inner end face portion 12b as the rear end face 12 of the main body portion 10 may also be referred to as a rear end face portion. The groove 15 is located between the outer peripheral surface 13 of the main body portion 10 and the inner peripheral surface 14 of the main body portion 10 (specifically, the rear inner peripheral surface portion 14a), and is a portion recessed over the entire circumferential direction at the rear end face 12. Specifically, the groove 15 is formed in the boundary portion (the step portion) between the outer end face portion 12a and the inner end face portion 12b in the rear end face (the rear end face portion) 12.

Thus, in the gasket 1 shown in FIGS. 5 to 9, the rigidity of the rear portion in the insertion direction V1 in the main body portion 10 is intentionally set low. Therefore, in the insertion process of the shaft member 200, the largely recessed portion (see FIGS. 5 to 8) and the portion including the groove 15 (see FIG. 9) in the main body portion 10 function as the weak portion and elastically deforms to be flat, and the magnitude of the reaction force acting on the outer peripheral surface 201a of the shaft member 200 from the seal portion 20 due to the elastic deformation of the seal portion 20 itself decreases. Therefore, after the top 21 of the seal portion 20 reaches nearly the position of the outer peripheral surface 201a of the small diameter portion 201, the supporting force for the seal portion 20 in the rear portion in the insertion direction V1 in the main body portion 10 is weakened. Specifically, the supporting force (rigidity) of the rear portion in the insertion direction V1 in the main body portion 10 for supporting a portion including the second inclined surface 23 in the seal portion 20 is weakened. Therefore, in the insertion process of the shaft member 200, the magnitude of the reaction force acting on the outer peripheral surface 201a of the shaft member 200 from the seal portion 20 decreases, and the maximum insertion load in the insertion process of the shaft member 200 becomes lower than the maximum insertion load in the case of not having the weak portion shown in FIGS. 1 to 3. As a result, a maximum insertion load can be set to the same degree as the degree in the case of the lip-type seal portion.

In addition, although not shown, in the gasket 1 of the modified example shown in FIG. 9, the rear inner peripheral surface portion 14a is located outward in the radial direction with respect to the front inner peripheral surface portion 14b, and the groove 15 may be provided between the rear inner peripheral surface portion 14a and the inner peripheral surface of the cylindrical portion 31 of the reinforcing ring 30. This may reduce the maximum insertion load more effectively. Further, in the gasket 1 shown in FIG. 9, a stepped portion is formed on the rear end face 12, but the stepped portion may not be formed.

In the above description, the gasket 1 is assumed to be inserted into the annular gap G between the housing 100 and the shaft member 200 by inserting the shaft member 200 into the gasket 1 in a state where the gasket 1 is inserted into the shaft hole 101 of the housing 100, however, the present invention is not limited to this, and the gasket 1 may be inserted into the annular gap G in a state where the shaft member 200 is inserted into the shaft hole 101 of the housing 100. In this case, the maximum insertion load when inserting the gasket 1 into the annular gap G is substantially the same as the maximum insertion load for the shaft member 200. The insertion direction V1 of the gasket 1 and the insertion direction V2 of the shaft member 200 may be the same.

In the above description, the gasket 1 is assumed to have a reinforcing ring 30, however, the present invention is not limited to this, and the gasket 1 may not have the reinforcing ring 30. In this case, the portion corresponding to the reinforcing ring 30 may be formed, for example, integrally with the main body portion 10 with a member made of the same material as that of the main body portion 10. The machine of the mounting object of the gasket 1 is not limited to the CVT, and may be any machine in which an annular gap is formed between the housing and the shaft member at least partially inserted in the housing, and needs to be sealed the annular gap.

While preferred embodiments of the present invention and modified examples thereof have been described above, the present invention is not limited to the above embodiments and the above modified examples, and various modifications and changes can be made based on the technical idea of the present invention.

INDUSTRIAL APPLICABILITY

The present invention is useful for facilitating assembling of the gasket into the annular gap.

The invention claimed is:

1. A gasket inserted into an annular gap between a housing and a shaft member at least partially inserted into the housing from one end side toward the other end side of the shaft member, the gasket comprising:
   a hollow cylindrical main body portion which is inserted into the housing and fixed to the housing, and includes an opening that is configured for receipt of the shaft member;
   a reinforcing ring buried in the cylindrical main body portion and that includes a cylindrical portion that extends in an insertion direction of the gasket between a distal entirely annular end face of the cylindrical main body portion and a rear entirely annular end face of the cylindrical main body portion, the reinforcing ring including a flange proximate the distal end face of the cylindrical main body portion that extends radially inwardly toward the opening; and
   a seal portion which extends inward from an inner peripheral surface of the cylindrical main body portion, the seal portion surrounding and abutting an outer peripheral surface of the shaft member, the seal portion and the cylindrical main body portion being integrally molded and formed of the same elastic material;
   wherein the seal portion is composed of a single protrusion extending along an entire circumference of the inner peripheral surface and protruding radially inward at an intermediate portion in the insertion direction surface of the main body portion, and
   wherein, in a cross-section of the gasket and along a line that is perpendicular to the shaft member and extends between a most distal end of the single protrusion and an entirely cylindrical outer peripheral surface of the cylindrical main body portion that is fixed to the housing, the cross-section of the gasket is continuously filled with a cross-section of the integrally molded cylindrical main body portion and seal portion and a cross-section of the reinforcing ring without including a cross-section of a vacant space along an entire length of the line that extends between the most distal end of the single protrusion and the entirely cylindrical outer peripheral surface of the cylindrical main body portion that is fixed to the housing.

2. The gasket according to claim 1, wherein an annular groove is formed on the rear end face in the inserting direction in the cylindrical main body portion.

3. The gasket according to claim 1, wherein a rear inner peripheral surface portion which is a portion rearward in the insertion direction from the seal portion in the inner peripheral surface of the cylindrical main body portion is located outward in the radial direction with respect to a front inner peripheral surface portion which is a portion forward in the insertion direction from the seal portion in the inner peripheral surface of the cylindrical main body portion.

4. The gasket according to claim 1, wherein a top of the seal portion is formed of a flat surface extending in parallel with the outer peripheral surface of the shaft member.

5. The gasket according to claim 1, wherein a top of the seal portion is formed of a flat surface extending in parallel with the outer peripheral surface of the shaft member, the rear inner peripheral surface portion which is a portion rearward in the insertion direction from the seal portion in the inner peripheral surface of the cylindrical main body portion and the front inner peripheral surface portion which is a portion forward in the insertion direction from the seal portion in the inner peripheral surface of the cylindrical main body portion are cylindrical surfaces extending in parallel with each other and being parallel with the outer peripheral surface of the shaft member, and the rear inner peripheral surface portion has a relatively larger diameter than the front inner peripheral surface portion.

\* \* \* \* \*